United States Patent
Wolff et al.

[19]

[11] Patent Number: 6,081,261

[45] Date of Patent: *Jun. 27, 2000

[54] MANUAL ENTRY INTERACTIVE PAPER AND ELECTRONIC DOCUMENT HANDLING AND PROCESSING SYSTEM

[75] Inventors: Gregory J. Wolff, Mountain View; David G. Stork, Stanford, both of Calif.

[73] Assignee: Ricoh Corporation, Menlo Park, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/551,535

[22] Filed: Nov. 1, 1995

[51] Int. Cl.⁷ ....................................................... G09G 5/00
[52] U.S. Cl. ........................................ 345/179; 178/18.01
[58] Field of Search ................................... 345/179, 180, 345/181, 182, 183, 173, 174, 175, 158, 169, 901, 146; 178/18, 19; 382/119–122, 181–184, 187, 188

[56] References Cited

U.S. PATENT DOCUMENTS

| | | |
|---|---|---|
| Re. 29,765 | 9/1978 | Crane et al. . |
| D. 362,663 | 9/1995 | Nguyen . |
| 3,906,444 | 9/1975 | Crane et al. . |
| 3,915,015 | 10/1975 | Crane et al. . |
| 4,241,409 | 12/1980 | Nolf . |
| 4,345,239 | 8/1982 | Elliott . |
| 4,468,694 | 8/1984 | Edgar . |
| 4,513,437 | 4/1985 | Chainer et al. . |
| 4,545,018 | 10/1985 | Clements et al. . |

(List continued on next page.)

FOREIGN PATENT DOCUMENTS

| | | | |
|---|---|---|---|
| 0 457 541A1 | 11/1991 | European Pat. Off. | ....... G06K 11/18 |
| 0 615 209A2 | 9/1994 | European Pat. Off. | ....... G06K 11/06 |
| 43 26371 A1 | 4/1995 | Germany | ....................... G06K 11/08 |
| 9308542 | 4/1993 | WIPO . | |
| 9409447 | 4/1994 | WIPO | ............................... G06K 9/00 |
| 9418663 | 8/1994 | WIPO | ............................... G09G 3/02 |
| 9521436 | 8/1995 | WIPO | ............................... G09G 3/02 |
| 9603737 | 2/1996 | WIPO | ............................... G09G 5/00 |
| 9614633 | 5/1996 | WIPO | ............................... G09G 5/08 |

OTHER PUBLICATIONS

"Digital pen recalls what it has written"—by Michele Clark—Magazine article, Undated.

"Atypical mice and related devices", Computer, IEEE Computer Society, Jun. 1995, vol. 28, No. 6, Product Reviews, p. 92 and 94.

Aeropoint™ User's Guide, Creative Labs, Inc., 1901 McCarthy Boulevard, Milpitas, CA 95035, Jul. 1995, pp. vii, 1–1, 1–3.

The DataPen™ User's Guide, Primax Electronics, 254 East Hacienda Ave., Campbell, CA 95008–9638, p. 1.

G. P. Torok "Electronic Blackboard Have Chalk Will Travel" 1977, pp. 19.1–22 to 19.1–25.

Primary Examiner—Regina Liang
Attorney, Agent, or Firm—Blakely, Sokoloff, Taylor & Zafman LLP

[57] ABSTRACT

A manual entry interactive paper and electronic document handling and process system uses a pen-like instrument (PI) with a writing point for making written entries upon a physical document and sensing the three-dimensional forces exerted on the writing tip as well as the motion associated with the act of writing. The PI is also equipped with a CCD array for reading pre-printed bar codes used for identifying document pages and other application defined areas on the page, as well as for providing optical character recognition data. A communication link between the PI and an associated base unit transfers the transducer data from the PI. The base unit includes a programmable processor, a display, and a communication link receiver. The processor includes programs for written character and word recognition, memory for storage of an electronic version of the physical document and any hand-written additions to the document. The display unit displays the corresponding electronic version of the physical document on a CRT or LCD as a means of feedback to the user and for use by authorized electronic agents.

21 Claims, 12 Drawing Sheets

U.S. PATENT DOCUMENTS

| | | |
|---|---|---|
| 4,561,105 | 12/1985 | Crane et al. . |
| 4,731,857 | 3/1988 | Tappert . |
| 4,751,741 | 6/1988 | Mochinaga et al. . |
| 4,787,051 | 11/1988 | Olson . |
| 4,806,707 | 2/1989 | Landmeier . |
| 4,856,077 | 8/1989 | Rothfjell . |
| 4,883,926 | 11/1989 | Baldwin . |
| 4,988,981 | 1/1991 | Zimmerman et al. . |
| 5,022,086 | 6/1991 | Crane et al. . |
| 5,025,314 | 6/1991 | Tang et al. . |
| 5,027,115 | 6/1991 | Sato et al. . |
| 5,159,321 | 10/1992 | Masaki et al. . |
| 5,164,585 | 11/1992 | Lieu . |
| 5,166,668 | 11/1992 | Aoyagi ................................. 345/180 |
| 5,181,181 | 1/1993 | Glynn et al. . |
| 5,215,397 | 6/1993 | Taguchi et al. . |
| 5,226,091 | 7/1993 | Howell et al. . |
| 5,227,622 | 7/1993 | Suzuki . |
| 5,239,292 | 8/1993 | Willan . |
| 5,247,137 | 9/1993 | Epperson . |
| 5,294,792 | 3/1994 | Lewis et al. . |
| 5,296,871 | 3/1994 | Paley . |
| 5,371,516 | 12/1994 | Toyoda et al. . |
| 5,396,265 | 3/1995 | Ulrich et al. . |
| 5,408,382 | 4/1995 | Schultz et al. . |
| 5,434,371 | 7/1995 | Brooks . |
| 5,436,792 | 7/1995 | Leman et al. . |
| 5,440,326 | 8/1995 | Quinn . |
| 5,444,192 | 8/1995 | Shetye et al. ............................ 178/18 |
| 5,477,012 | 12/1995 | Sekendur ................ 345/179 |
| 5,506,605 | 4/1996 | Paley . |
| 5,512,892 | 4/1996 | Corballis et al. . |
| 5,517,579 | 5/1996 | Baron et al. ............................ 382/187 |
| 5,526,018 | 6/1996 | Fisher . |
| 5,548,092 | 8/1996 | Shriver . |
| 5,570,109 | 10/1996 | Jenson ..................... 345/146 |
| 5,587,558 | 12/1996 | Matsushima ............................ 345/173 |
| 5,587,560 | 12/1996 | Crooks et al. . |

MANUAL ENTRY INTERACTIVE PAPER AND ELECTRONIC DOCUMENT HANDLING AND PROCESSING SYSTEM

FIELD OF THE INVENTION

The invention relates to the field of handling paper documents and their corresponding electronic versions by allowing the user to interact with both versions of the same document simultaneously.

BACKGROUND OF THE INVENTION

Because people prefer paper documents for some tasks such as reading or annotating documents while electronic documents seem to be preferred for tasks such as storing, searching or communicating, it is desirable to provide document systems that maximize the user-friendly aspects of both approaches.

Unfortunately, there has been a large technological barrier between the paper and electronic documentation worlds. For example, electronic symbols may be readily converted into a printed page, but printed documents are not readily translated into compact electronic symbols. Also, the human interface with each of the mediums are radically different: writing on paper (or similar surfaces) comes naturally to children, while creating electronic documents generally requires the use of application software, keyboard, mouse, display, etc.

The present invention provides a human interface input/output device that is:

(a) small and portable,
(b) natural to use as a pen,
(c) works with both electronic and paper documents, and
(d) avoids complications and inconveniences of devices such as bulky scanners and digital pads.

As a result, users can readily create or manipulate paper documents while simultaneously making corresponding electronically-coded images of the same created or manipulated paper document. This is accomplished by means of a hand-held, pen-like instrument that can write on paper documents, simultaneously sense the writing, and interpret and enter the written markings in the electronically-coded document. Also, image sensing allows the system to identify the type of document being subjected to manually-written modifications.

SUMMARY OF THE INVENTION

A manual entry interactive handling system uses a writing instrument to manually write data on an ordinary document (that can have pre-printed information) and automatically interpret the written data so that a corresponding electronic document containing any pre-printed document information is modified by adding the written data to the stored electronic document. Both pre-printed data and the interpreted written data can be electronically displayed, the system comprises:

(a) a physical document page with a surface suitable to be written upon that can also contain pre-printed document information;
(b) a pen-instrument for writing on the physical document surface, the pen-instrument having suitable transducers for sensing both the written data and the multi-dimensional physical forces (e.g. up to three rectilinear and two rotational components) exerted on the pen instrument when writing and for reading pre-printed digital codes, and a communication link to transmit the transducer data to a base unit; and (c) a base unit for receiving the transducer data and converting the transducer data to binary digital information suitable for processing in the base unit CPU, or another computer, for document identification and for incorporating the written information with the pre-printed document information.

In another embodiment, the transducers are capable of defining pen motion resulting from movement of the pen-instrument for other than writing such as pointing for the control of an object (such as lights).

BRIEF DESCRIPTION OF THE DRAWINGS

The present invention is illustrated by way of example and not limitation in the figures of the accompanying drawings, in which like references indicate similar elements and in which.

DETAILED DESCRIPTION

A. Application Areas

Figure 1:
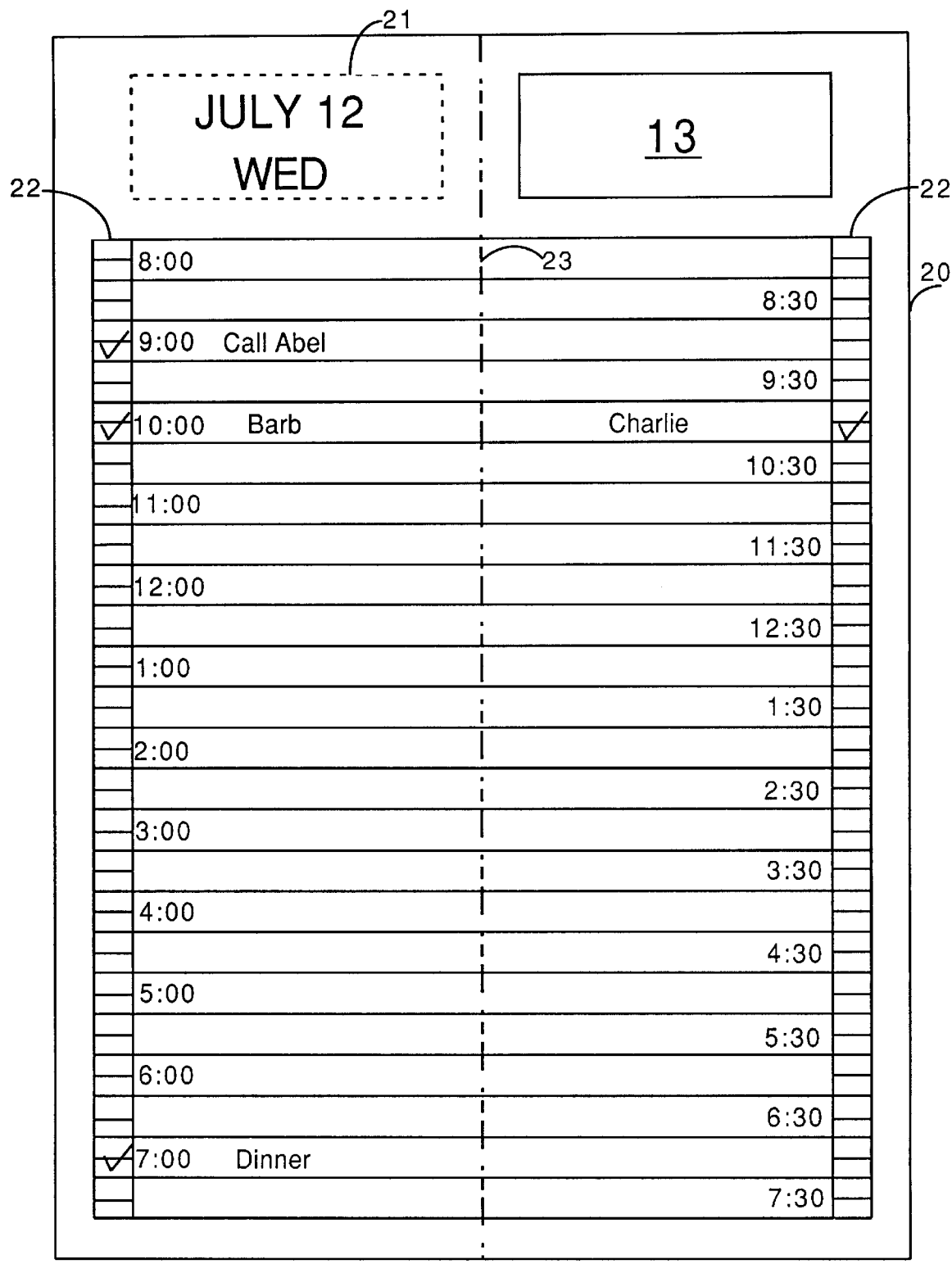
FIG. 1 shows the format of a daily CB page.

An interactive document system based on a pen-like instrument, or pen-instrument for convenience, has application in numerous document systems that include, but are not limited to, the following systems.

Calendar Book: appointments entered on a physical page of a calendar book are sensed, interpreted, and recorded on an electronic calendar as well.

Forms Processing: filling out of a prescribed form would automatically cause the generation of a corresponding electronic form, the paper version being kept, as needed, for legal or safety reasons. A significant cost reduction in computer data entry results.

Signature Verification: improved reliability of signature recognition obtained by storing the signature related time-course by using spatial location and pressure to characterize the signature. These parameters are not available to the forger from viewing the signature.

Interactive Fax: a facsimile system that permits users to receive documents by means of "links" similar to WebFax. This would permit the user to forward pages to selected users by simply writing the desired destination, which when sensed and interpreted would provide the communication "link". Also, the user can annotate the document and the transmit or store the document with the annotation without the use of a facsimile scanner.

Document Editing: any paper document can be edited by crossing-out words, and by the use of typographic notation for other editing operations, or annotated, or sent elsewhere. The paper modifications immediately affect the electronic version so that the electronic version can serve as the true source document because any access of, or communications of, that document would reflect all edits or annotations.

Information Management: scanning the description of a reference document can have that paper (or its reference) stored in a designated file without photo-copying.

Document Retrieval: searching of electronic databases by writing or circling a few keywords, thumbnail descriptions, or by drawing pictures, which, when interpreted, provide the data location.

Note Book: using the pen-instrument for writing notes on paper and for electronically retrieving notes previously written on paper and stored from a sequentially ordered (and/or an otherwise organized) electronic memory file.

B. System Details
B.1 Calendar Book (CB)

Because of the variety of possible document systems, as outlined in the preceding section, the details of the invention will be presented using a single application from which the extension to other applications will be readily understood by those practicing the art. For this reason, the *Calendar Book* is described below.

The *Calendar Book*, or "CB" hereinafter, looks like a conventional calendar having a page representing a segment of calendar time: a day, a week, a month, or a year. Each segment of time is further subdivided as needed: a year into months and weeks, a month into weeks and days, a day into hours and fractions thereof. Digitally coded information is printed on each page so that the pen-instrument can be used to read the pertinent digital code that identifies the page format and the segments of calendar time spanned by the CB page.

FIG. 1 shows a page 20 from a CB using a one day per page format. This version allows selectable information options to be printed for each day. An area is set aside for a bar code identifier 13 for specifying the date (year, month, and day) and user I.D. The date (year optional) is also printed in area 21. Column of rectangles 22 and 22' are available for selecting and identifying the time by entering a suitable mark (such as a check mark) in the appropriate rectangle. Column 22 and 22' have identical meanings and are provided so that two entries, only 15 minutes apart may be entered each using a half width and indicated as separate by dividing line 23. For example, an appointment with Baker is indicated for 10:00 a.m. while an appointment with Charlie is indicated for 10:15 a.m. In other words, each hour is divided into 15 minute-segments in this example. Other increments such as one-half hour and 10 minutes could also be specified. The user's choice would only be constrained by the application being served and the page size (or detail) available. The time of day is also indicated by the position of a written entry for any given calendar page format. The pen-instrument provides the writing point and the optical, the positional, and the writing point to paper pressure data to the computer for interpretation, storage and graphical display.

The graphical display can provide immediate feedback by use of an optional cathode ray tube (CRT) display. The feedback can be a simple recreation of the written message by using pen-instrument positional writing point pressure data or the interpreted written message from a cursive character recognition device using the same data. In the latter case, incorrectly recognized written data can be scratched-out or over-written.

Bar codes are read by a bar code scanner on the side of the pen-instrument. The bar code recognition device may either constantly scan in search of a legitimate bar code or operate when the positional sensors indicate that the pen-instrument is in a horizontal position suitable for reading a bar code.

B.2 Operating Mode

Figure 2:
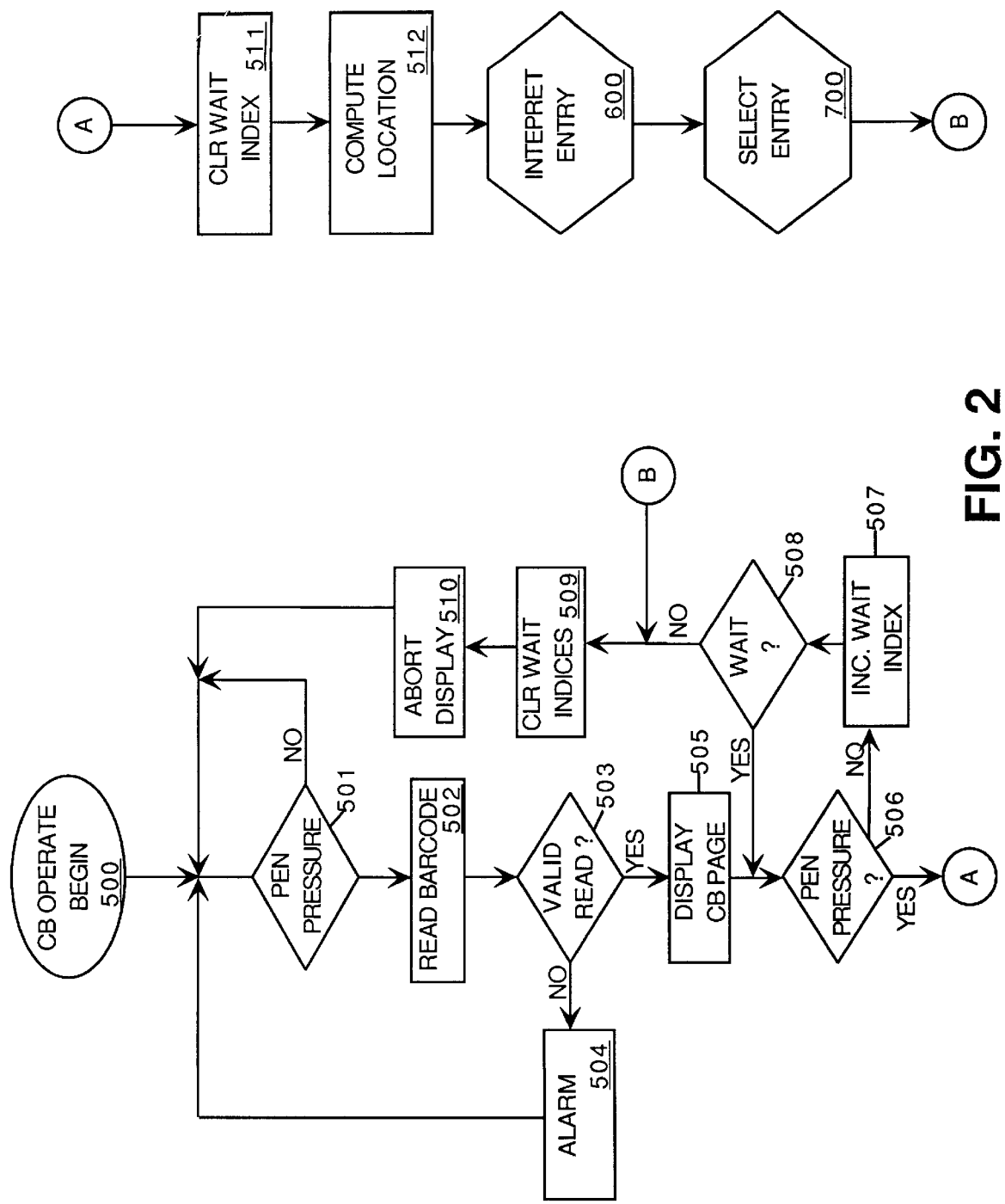
FIG. 2 is a flow diagram of the basic operation of a CB system.

FIG. 2 is a flow diagram describing the basic operating mode of a particular CB. The operation begins at step 500 where it is assumed that a fixed format has been prescribed and its description is stored with the configuration information for that CB. Configuration data includes calendar type, chronology layout defining time intervals, segments, and writing spaces. Also, a user list is stored against which the bar-code I.D. can be checked for validity.

At step 501, the computer checks if the pen-instrument is moving horizontally, indicating that a CB operation is about to be initiated by reading the bar-code located in area 13. If not, the system goes into a wait loop in which the pen-instrument motion is monitored. If the appropriate horizontal motion is detected, the process proceeds to step 502 in which the bar-code I.D. is read by scanning bar-code area 13 with the pen-instrument. If a valid bar code signal results, step 503 moves the process to step 505, otherwise the process goes to step 504 where an audible and/or visual alarm is set for informing the user that access is denied and the system returns to step 501. The bar-code can also be compared with a list of authorized codes and if a match exists the CB access request is validated and proceeds to step 505. At this juncture, the pen-instrument user may try to read the bar-code again or investigate the system for the cause of the misread bar-code data.

At step 505, the electronic version of the CB page can be displayed on a screen (CRT or LCD) with the display including all prior entries on that page. The process enters another wait loop through test step 506 which checks if the writing point pressure signal exceeds threshold. If it does, this is taken as an indication that a pen-instrument operation is initiated and the process moves to step 511 where the previous wait loop index (step 507) is cleared. Otherwise, the process goes into a wait loop comprising step 507 that counts the amount of passes (or time) that the loop is traversed. Step 508 tests if a preset time has been exceeded, and if not goes back to step 506. Otherwise, the loop count index of step 507 is cleared in step 509 and the display is aborted in step 510 before returning to step 501.

Step 512 establishes the location of the written entry by using the gyroscopic rate information. By knowing the location of the bar-code page identification and by integrating gyroscopic velocity information, the location of place at which pen pressure is exerted in step 506. This information is used to locate the corresponding electronic entry on the electronic graphical display.

Figure 3:
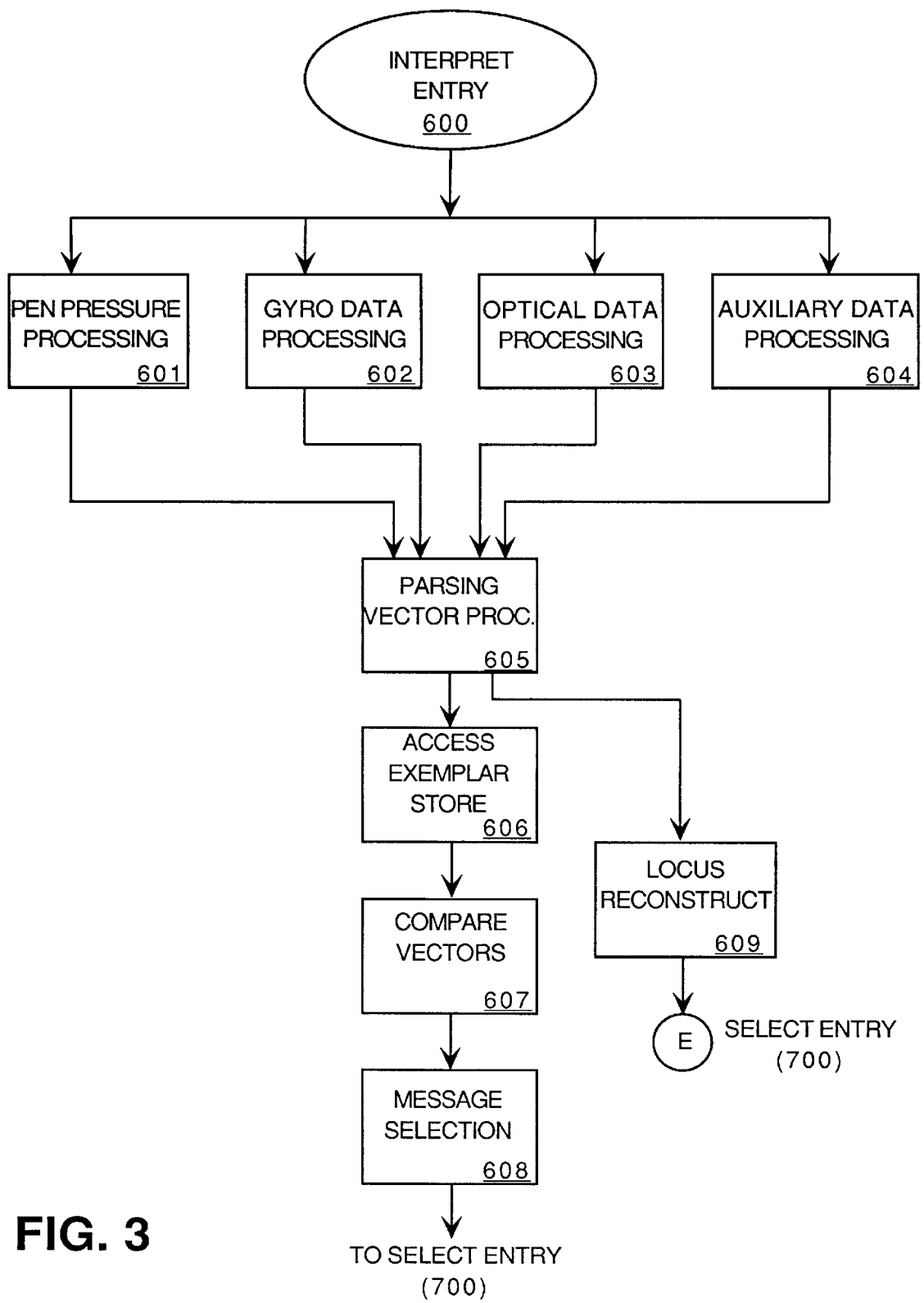
FIG. 3 is a flow diagram for procedure 600 for interpreting the pen-instrument input data.

From step 512, the process moves to step 600, a procedure for interpreting the message that the pen-instrument has entered on the CB page. The procedure is shown in greater detail in FIG. 3. The multi-sensor output signals from the pen-instrument are in electrical form, preferably as binary coded data. In this example, four data types are used and processed: pen-instrument pressure processed in processor step 601, gyroscopic restoring forces in processor step 602, optical data representative of the pen-instrument written message in processor step 603, and an auxiliary data signal representative of special cues for identifying calendar and position data from the printed CB page in processor step 604. Each processor step 601–604 extracts signal features from its associated data source. A particular written data entry may include a number of distinct message unit such as a time code derived from the printed CB page, and a written portion that may include a name and place. The message input sequence is parsed into message segments in vector processor step 605 using the various processed sensor data from processors 601–604. Thus, the presence of the writing point-to-paper pressure over an interval of time indicates writing a message segment. Gaps between pressure intervals may indicate the gap between segments. A gap can also indicate a crossing of a "t" or the dotting of an "i" after the word is written. In the latter case, gyroscopic data can confirm the backward pen-instrument motion and subsequent pen-instrument pressure coupled with either a stationary dotting action or a forward sweeping crossing of a "t". By using time-synchronized multi-sensor data, the pen-instrument written message can be used to parse the input message into distinct and interpretable acts. Parsing vector processor 605 produces a set of vectors describing each written segment which are then identified by comparing the parsed vectors with a stored set of exemplar in exemplar store unit 607 by comparator step 606. In step 608, each parsed segment generates a set of candidate vectors corresponding to a plausible parsed message segment, which are preferably ordered in descending order of plausibility, i.e., of being the correct message segment.

The plausible candidate message units from message selection step 608 are arranged by sequence index, $0 \leq k \leq K-1$, indicating the order of occurrence of K message segments. The $k^{th}$ message unit has $L_k$ plausible candidates designated by index $I_k$, where $0 \leq I_k \leq L_k-1$ and $I_k$ indicates decreasing plausibility with increasing value of $I_k$.

Because the system should provide a means for displaying a facsimile reconstruction of the written message, the output of parsing vector processor 605 also provides an output to locus reconstruction generator 609 that operates on the gyroscopic and pen pressure data to reconstruct the locus of the pen point while writing. The digitized locus is passed on to entry point E of FIG. 4 for conflict resolution. In some applications, a facsimile of the original written message is preferred and in others it provides a back-up to an alpha-numeric interpreted representation based on character pattern recognition techniques.

Figure 4:
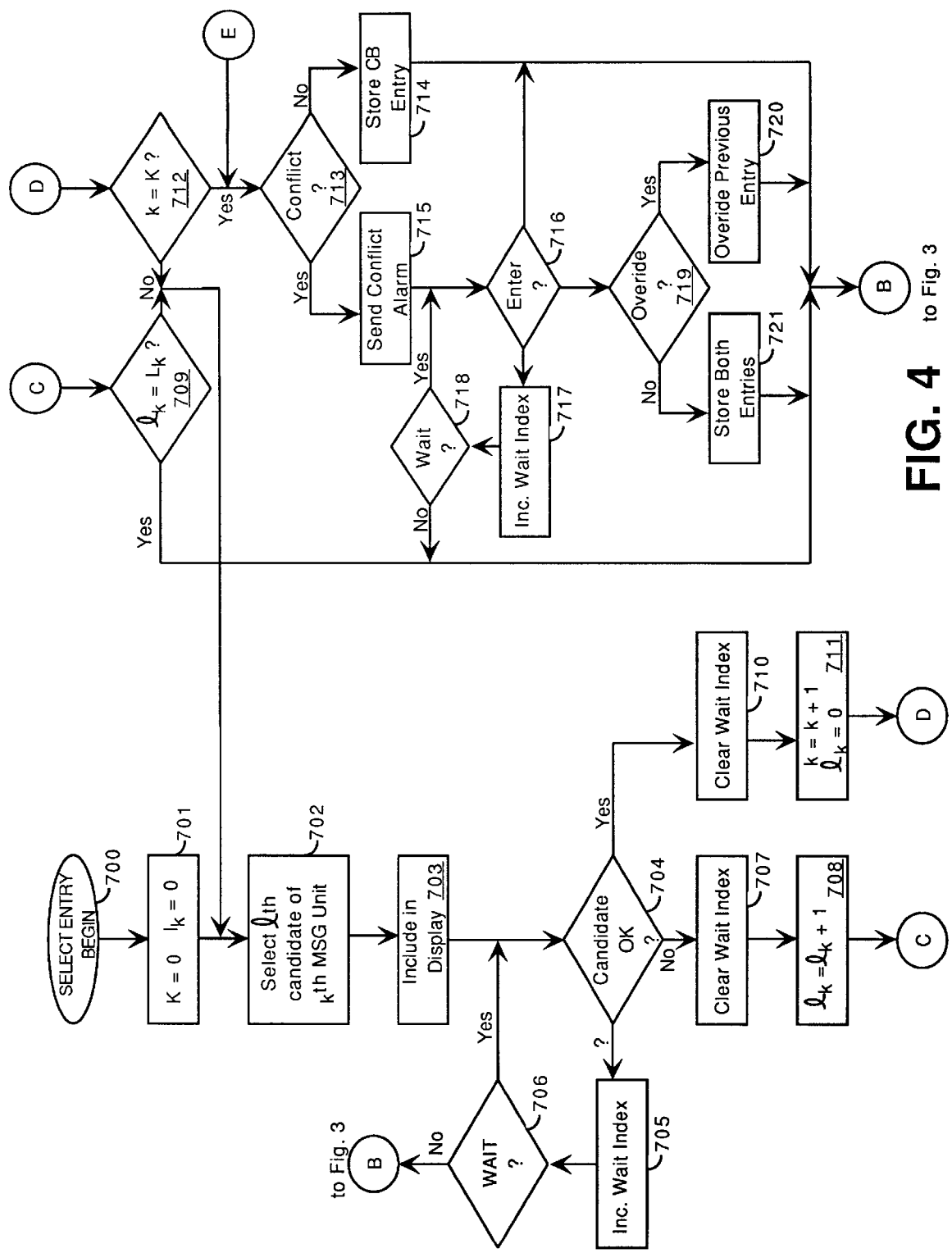
FIG. 4 is a flow diagram of the entry select procedure 700.

Step 700 is a multi-step process as shown in FIG. 4. At step 701, the message unit index, k, and the plausible candidate index, $I_k$, are cleared (k=0, $I_k$=0). At step 702 the $I_k$ candidate of the $k_{th}$ message unit is retrieved from memory and displayed graphically as trial message unit super-imposed on the appropriate CB page at the location corresponding to that written on the actual page calendar by the pen-instrument in step 703. At this point in time, the CB user is allowed to examine the trial message unit in test step 704. Three exits from step 704 are provided: a wait loop (similar to that previously described) comprising wait loop indexing step 705 and test step 706 that examines the wait loop index to determine if the process should be aborted by returning to input B of FIG. 2 or returning to step 704. If the user indicates by the pen-instrument that the candidate trial message unit is correct by making an appropriate pen-instrument movement (such as simulating or actually writing a check mark if correct and an "X" make if not), the process moves to step 710 where the wait loop index is reset and then step 711 where index k is incremented and $I_k$ is set to zero.

At step 712 a test is made to determine if all message units have been displayed and, if not, the process returns to step 702.

If the user indicates at test step 704 that the trial candidate message unit is not correct, the process goes to step 707 where the wait loop index is cleared and then to step 708 where the plausible candidate index $I_k$ is incremented. At step 709, $I_k$ is checked to determine if all of the candidates have been exhausted and, if not, the process returns to step 702. If all candidates have been exhausted, the process returns to the beginning via input B of FIG. 2.

If all message units are accounted for in step 712 (implying the graphical message on the screen is correct), the process checks to see if any conflict exists because two events are scheduled for the same time. If no conflict exists, step 714 stores the CB entry and the process proceeds to input B of FIG. 3. If a conflict exists, a conflict alarm is given on the screen display or by any other means such as an audible alarm (step 715) and the user is given time to respond by the wait loop (steps 717, 718). If the response is not timely, the process aborts by returning to input B of FIG. 2. If the user indicates that the new message should not be entered, step 716 aborts the process by returning to input B of FIG. 2. If the user indicates at step 716 that the new entry should be entered, step 719 asks if the previous message is to be deleted and the new entry entered. If the user indicates by an appropriate signal from the pen-instrument that previous message is to be overridden, the process goes to step 720 otherwise both forms of the written message are retained in step 721.

Process 700 of FIG. 4 is designed to select correctly identified candidates from a written character recognition device in step 704. However, an optional embodiment would provide for sending the processed data outputs from processing steps 601–604 of FIG. 3 to an optional write simulation step 609 where the processed sensor data is used to generate a replica of the user's written message without any writing recognition processing steps and is then displayed as a copy of the hand written message on the document. Also, both forms of written messages (an ASCII encoded interpretation of the message and a replica of the original) can be retained for future reference and selectively displayed on the CB display. By providing this option, the writing recognition process does not have to be 100% accurate.

In this manner, the electronically stored version of the CB can served as the true source document for which the paper version and trail exists in close accord with the electronic version. If the paper version begins to become unmanageable because of numerous changes, the user can obtain a new print-out of the page which may be a new page without any entries or a new page with all up-to-date entries.

Because the source exists in electronic form, electronic agents can use this information to aid the user by, for example, reminding users of appointments, performing group scheduling with other agents, reviewing the series schedule, and providing support information for a given appointment.

B.3 The CB System

Figure 5:
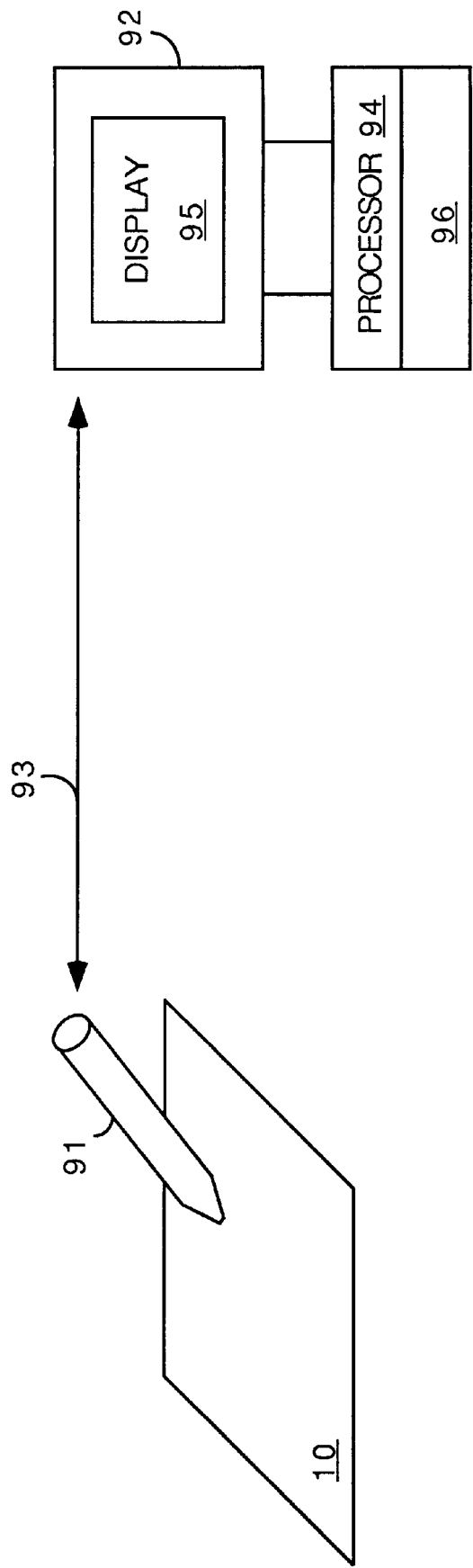
FIG. 5 shows a CB system's major components.

The CB system 90, shown in FIG. 5, includes four major hardware components:

(1) a CB page 10 or 20, as previously described;
(2) a pen-instrument (PI) 91 for providing a user with a means for entering data (both printed digital and written);
(3) a base-unit 92 for electronically processing and storing data received from the PI and including processing and conditioning electronics 96 and optional graphic screen display 95; and (4) a communication channel 93 between the PI and base-unit.

B.3.1. Pen-instrument (PI) 91

Figure 6:
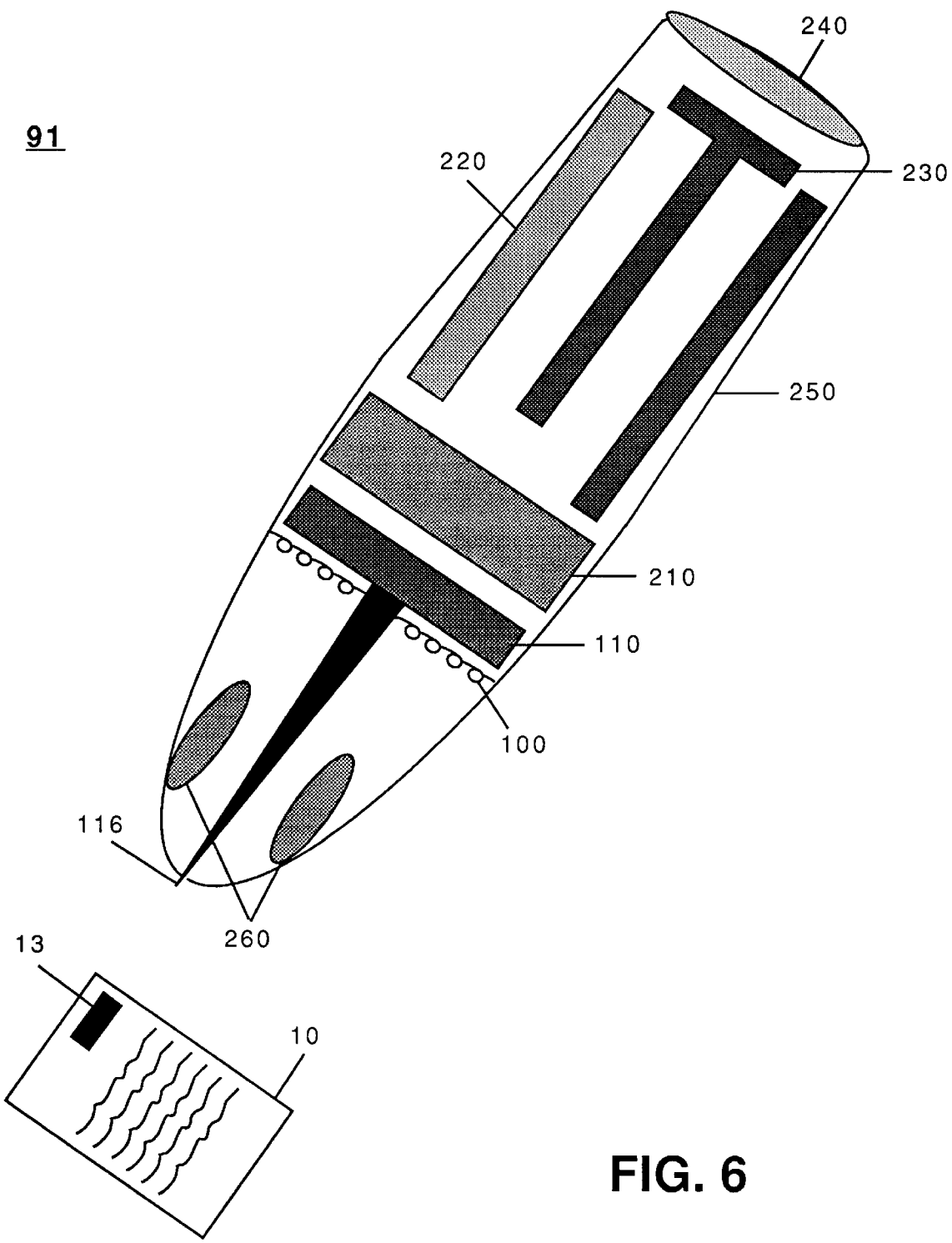
FIG. 6 shows the architecture of a pen-instrument.

PI 91 is configured as a "normal" pen, i.e. a writing instrument, that is to be conveniently held and used for writing on a CB page 10 as shown in FIG. 6. In addition to providing a writing point that deposits ink (or other writing medium) on to paper surface by contact, the PI incorporates a battery power source 250, and transducers for providing information for the interpretation of the user written data or printed digital information from the DB page, including the following.

Position Sensor 210: an inertial reference system is provided by a gyroscope (gyro) in which a rotating member will continue to turn about a fixed spin axis as long as no forces are exerted on the member and the member is not accelerated. Gyro attitude transducers (free gyros) are used as two-degree-of-freedom gyros that can provide an output for each of two of a PI's three attitude planes: pitch, yaw, and roll (or x, y, and z axes). Rate gyros are attitude-rate transducers that provide an output signal proportioned to angular velocity (time rate of change of attitude). The rate of change of the two axes representing the plane of the CB page are used to interpret the motion and relative position associated the use of the PI. Accelerometers may also be used for position sensors by double integration of the acceleration signals.

Figure 7:
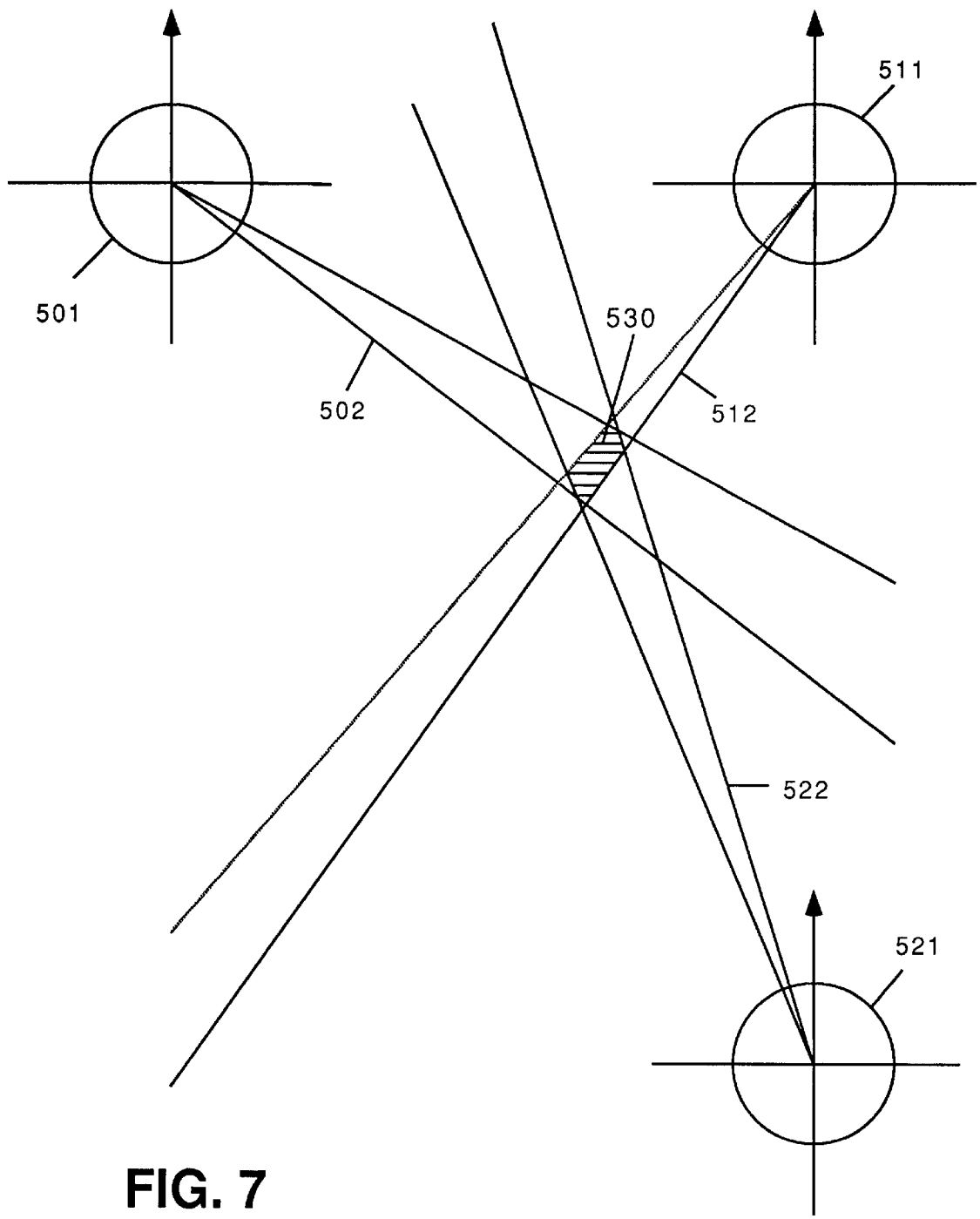
FIG. 7 shows the geometry of an infrared PI positioning system.

When the PI is equipped with an infrared (IR) detector, a multiplicity of two or more external IR radiating scanning sources located at prescribed positions can be used to track the position of the PI by using triangulation techniques that measure the angle at which each IR scanning source illuminates the PI. Alternatively, the PI can be equipped with an IR transmitter and two or more external scanning receivers located at prescribed positions can be used to track the position of the PI by triangulation. FIG. 7 shows the geometry of an IR tracking system using three external positions labeled 501, 511, and 521. Each position has a directive scanning beam (receiving or transmitting) 502, 512, and 522 associated respectively with positions 501, 511, and 521. The shaded area, labeled 530, represents the intersection of the beams and corresponds to the estimated position of the PI.

Figure 8:
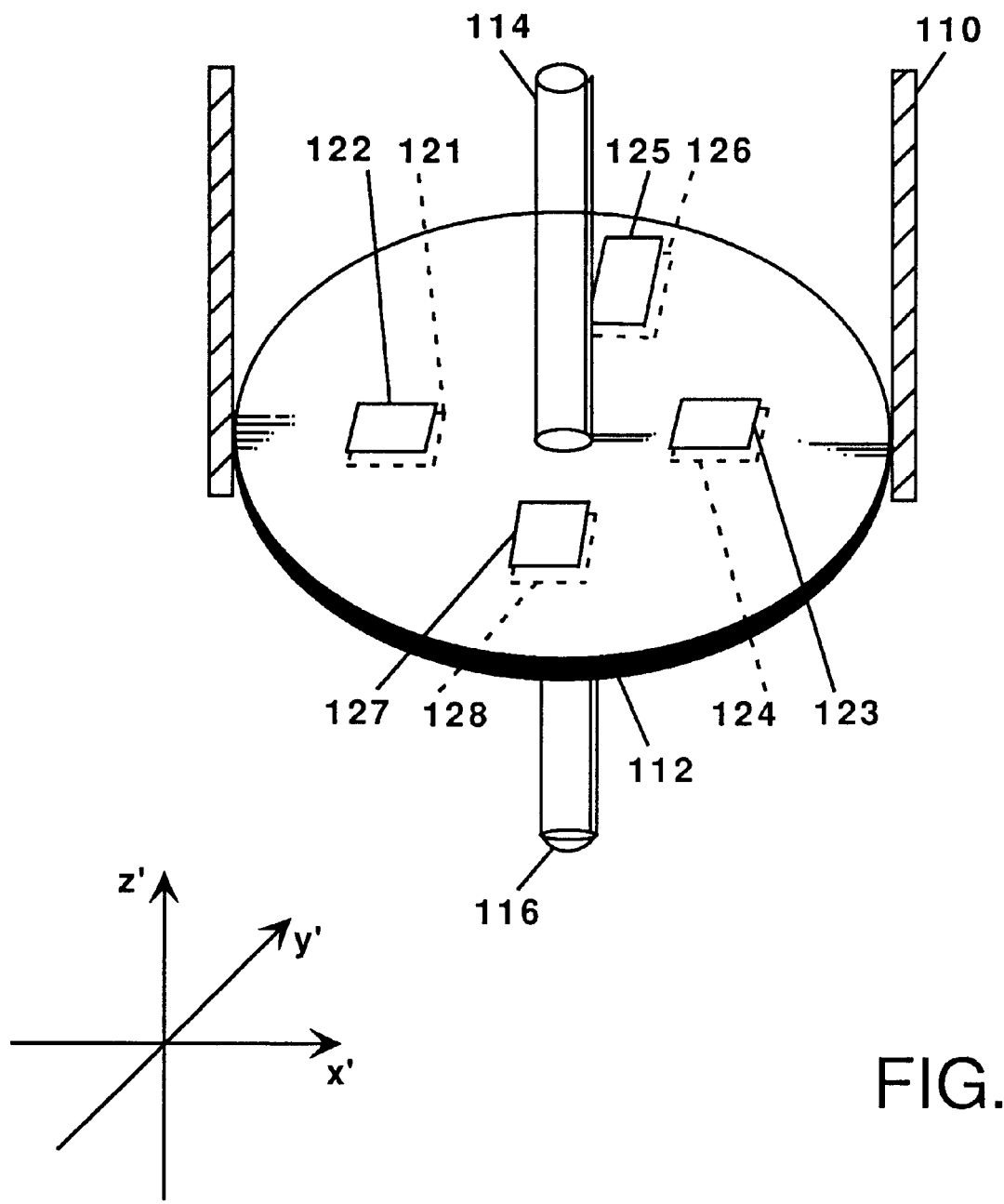
FIG. 8 shows an arrangement of strain gauge transducers in a pen-instrument.

Pressure Sensors 100: strain gauges (or other pressure sensitive transducers such as piezoelectric or reductive force transducers) connected to the shaft of the pen tip of the PI are used to record the forces applied to the tip by measuring the force exerted on four pairs of orthogonal strain gauges mounted on a flexible diaphragm that is attached to the inner walls of the PI with the pen shaft connected to and passing through at right angles to the diaphragm center. FIG. 8 shows how the pressure sensors are mounted in the PI. The operation of such a structure has been described by Crane et al. in U.S. Pat. No. Reg. 29,765.

FIG. 8 shows a PI cylindrical lower end 110 that houses a ball-point 116 on the lower end of shaft 114 containing the ink reservoir. The shaft, supported by a non-conducting flexible diaphragm 112 that is attached to cylindrical wall 110, causes the diaphragm to flex when pressure is applied to ball-point 116. As a result, strain gauges 121–128 that are affixed to diaphragm 112 are strained (or compressed) in accordance with the flexing of diaphragm 112 in response to the forces experienced by ball-point 116. In this manner, the forces experienced by ball-point 116 are converted into resistance changes in the strain gauges 121–128.

Figure 9:
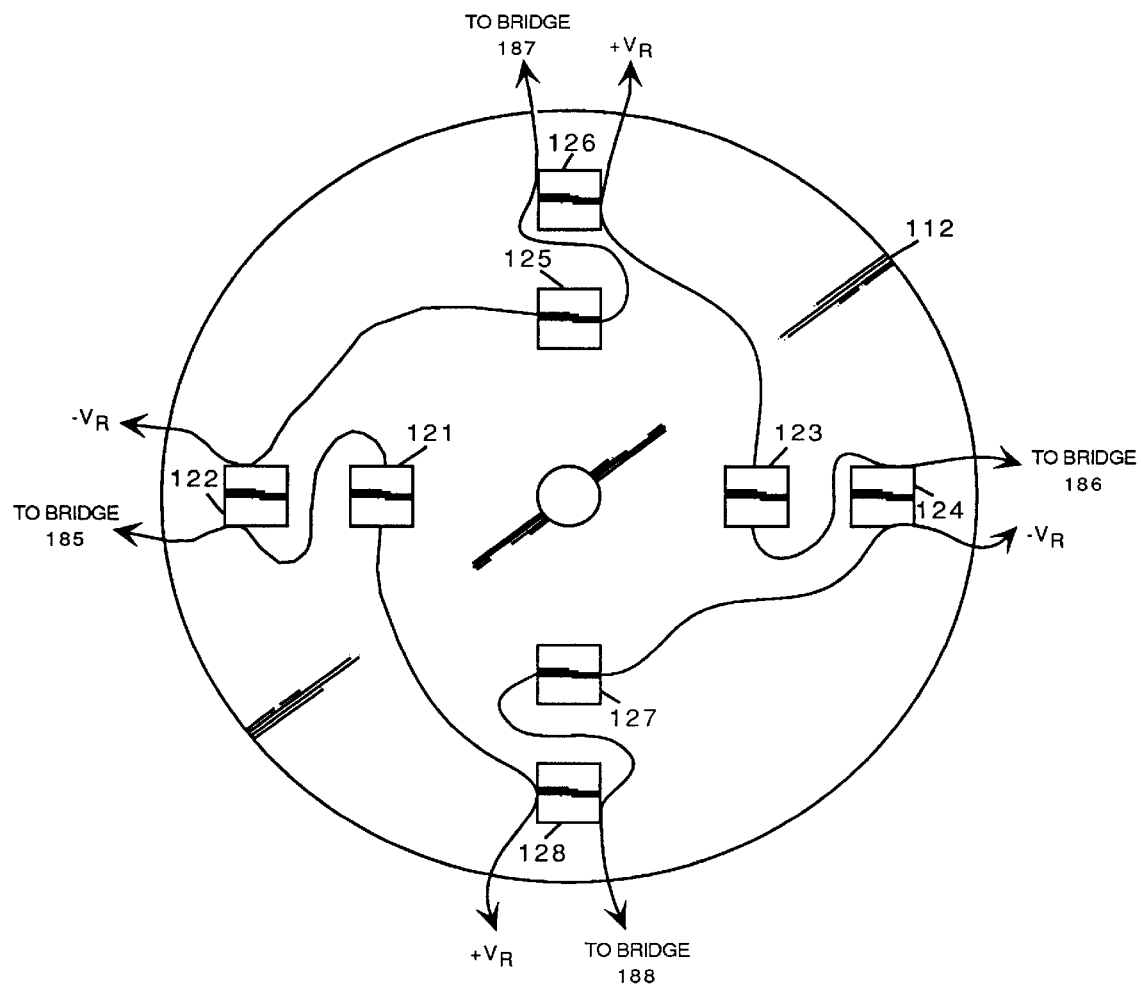
FIG. 9 shows the interconnections of the strain gauges on the flexible diaphragm.
Figure 10:
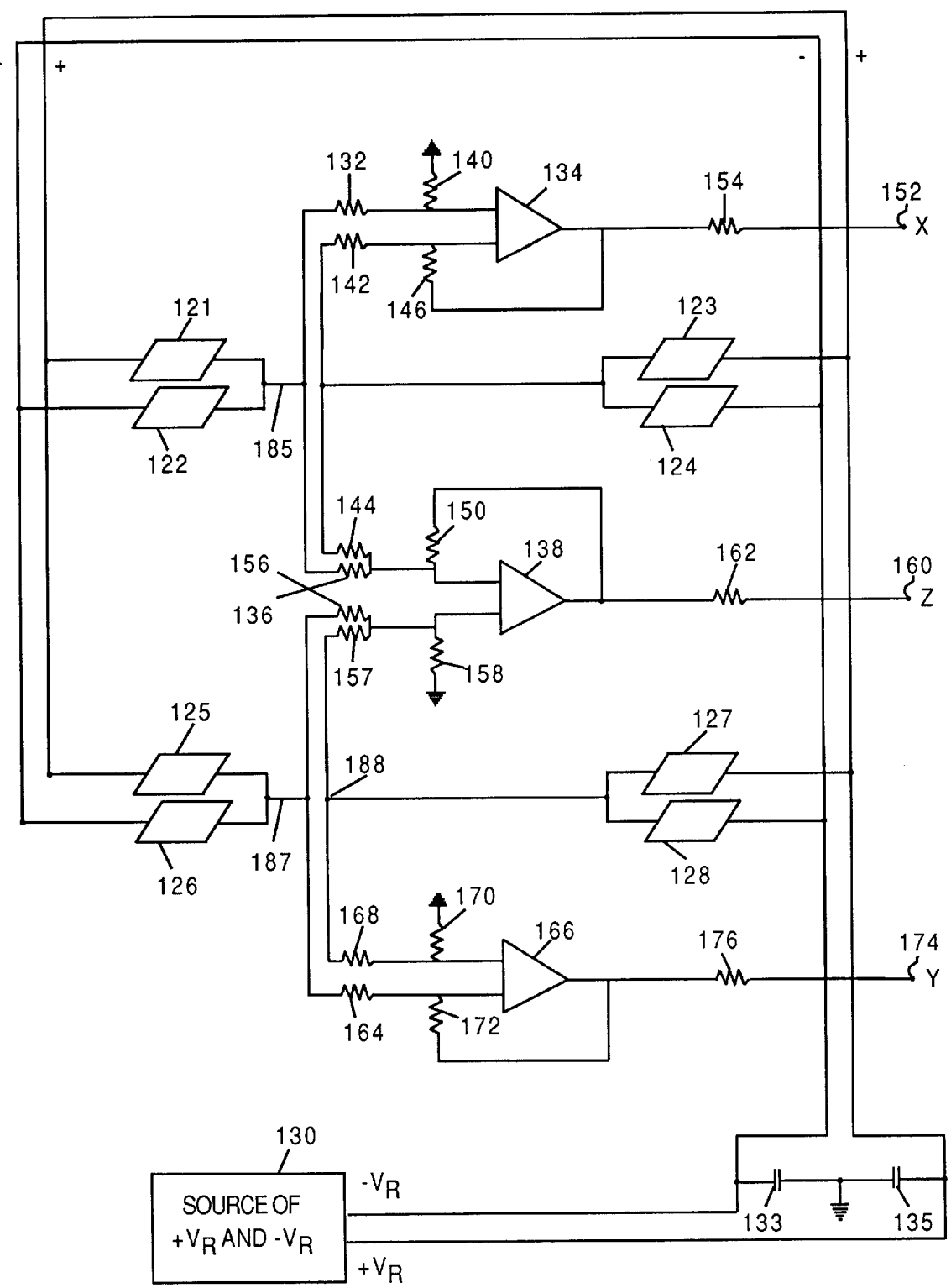
FIG. 10 is a triple bridge circuit for processing the strain gauge transducer data and for producing x, y, and z force components.

Because the strain gauges are paired and mounted on opposite sides of diagram 112, each pair, (121, 122), (123, 124), (125, 126), and (127, 128), tends to have opposite forces (tension vs. compression) applied to the upper and lower strain gauges. When a force is applied in the x-y plane (CB page plane) to ball-point 116, diametrically opposite pairs tend to have opposite tension and compression forces. However, when a force perpendicular to the x-y plane is applied, all pairs tend to experience similar distortions. These characteristics permit the separation of the ball point force to be resolved into three orthogonal components (X, Y, Z) where X and Y are in the x-y plane and Z is perpendicular to the x-y plane. Thus, by connecting the strain gauges 121–128 as shown in FIG. 9 and applying the strain gauge connections to the multiple bridge circuit shown in FIG. 10, the ball-point force is resolved at output terminals 152, 174, and 160 into the X, Y, and Z components, respectively.

Figure 11:
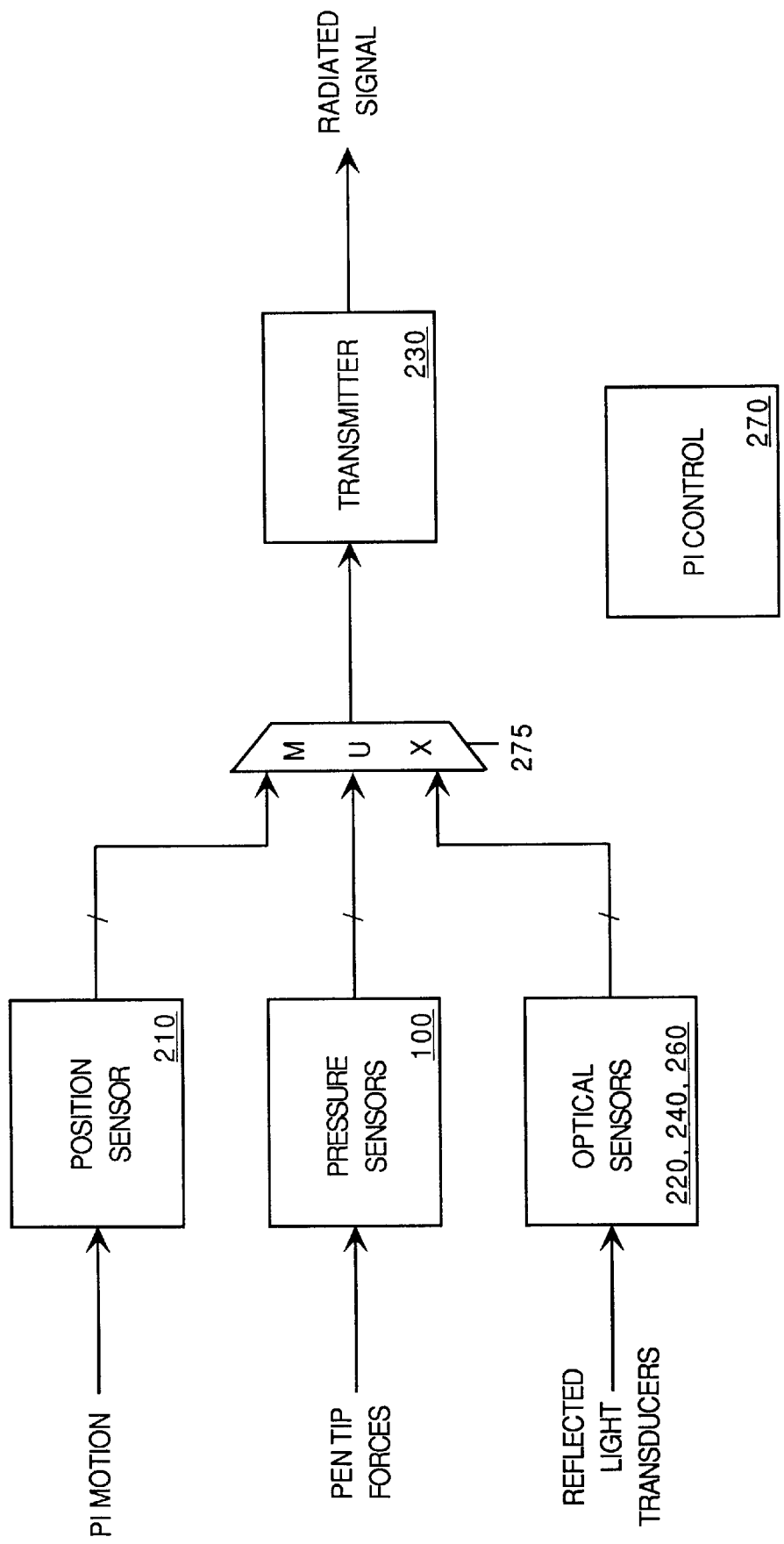
FIG. 11 shows a PI unit block diagram.

The strain gauge bridge circuitry of FIG. 11 is preferably mounted within the PI unit for greater noise immunity.

Although FIG. 8 shows shaft 114 parallel to the z' axis and perpendicular to the x'-y' plane, the writing surface of a CB page (x-y plane) generally would not be perpendicular to the z' axis because a "naturally" held pen-instrument would from an included angle between shaft 114 and the CB page surface of less than 90°. The transformation between two coordinate systems (x, y, z) and (x', y', z') that share a common origin (the pen tip) is readily accomplished by the following vector relationship.

$$\begin{bmatrix} x \\ y \\ z \end{bmatrix} = \begin{bmatrix} \lambda_1 & \lambda_2 & \lambda_3 \\ \mu_1 & \mu_2 & \mu_3 \\ \gamma_1 & \gamma_2 & \gamma_3 \end{bmatrix} \begin{bmatrix} x' \\ y' \\ z' \end{bmatrix}$$

where $[\lambda_n, \mu_n, \gamma_n]$, for $1 \leq n \leq 3$, represents the direction cosine vector of the (x, y, z) unit vector with respect to the (x', y', z') unit vectors (for example see Korn and Korn, "Mathematical Handbook for Scientists and Engineers," McGraw-Hill Book Co., New York, 1961, section 3.1-12, "Translation and Rotation of Rectangular Cartesian Coordinate System").

By knowing the angular orientation of shaft 114 with respect to the CB page (x-y plane) and the (x', y', z') components of force, the horizontal and vertical forces in the (x, y, z) system are readily obtained. Also, any rotation of the PI coordinates with respect to its inertial (gyro) system may also be accommodated by use of the above transformation.

The angular rotation of shaft 114 would tend to be the same each time the PI is used by a given user. This would permit system to "learn" the proper value of the direct cosines or, equivalently, the angles of rotation by taking samples of vertical forces (z), horizontal plus vertical forces (x, z), and longitudinal plus vertical forces (y, z) when a given user respectively exerts a vertical force on the page, writes a horizontal line, and writes a longitudinal line.

The transformation of coordinates for pen tip forces is not essential because the information content of a vector is not changed by a linear coordinate transformation. However, it may be useful for the normalization of forces so that they are independent of how the pen-instrument was held. However, un-normalized forces may be useful for signature verification, because of the added parameters relating to how the pen-instrument is held and used.

Pressure sensor information is useful for recognizing when a written entry is made on the CB page and for parsing the entry into message units for easier message recognition. It is also useful for signature verification.

Optical Sensor 220: a charge-coupled-device (CCD) optical scanning transducer is used for reading reflected light variations from a scanned portion of the CB page covered by the CCD array. The transducer is used to scan the identifying CB page bar-code. The CCD array can be located on the PI in several different areas:

(a) a linear side mounted array 220 along the length of the PI is useful for scanning a large segment of the page;

(b) a CCD array 260 at the tip of the PI pen or to one side of the tip is useful for identifying the local context of the document an exact location of the PI pen tip by recognizing pre-printed marks; or (c) a CCD array 240 at the back (i.e. "eraser") end of the PI because it is more intuitively acceptable than a side mounted array.

Regardless of the location, the CCD sensors must be able to read digitally encoded and pre-printed information and support at least rudimentary optical character recognition (OCR). The particular choice of CCD will dictate the associated illumination requirements.

A communication path 93 is needed for linking PI 91 with base unit 92 where most signal processing of the PI sensor occurs. A wired communication link 93 can use a small tether connecting the PI to base unit 92 but a wireless connection using either infrared or radio techniques would be preferred. For this purpose transmitter/receiver unit 230 is incorporated in PI 91.

FIG. 11 is a block diagram of the PI electronic system showing physical inputs to the system at left that include forces associated with motion, pen-tip forces due to writing, and reflected light for optical ready. These physical inputs are applied respectively to position sensor 210, pressure sensors 100, and optical sensors 220, 240, and 260. The sensor outputs are multiplexed into the modulator of transmitter 230 by multiplexer (MUX) 275. MUX 275 may be either a time-division or frequency multiplexer. Overall control of the PI system is provided by controller 270.

B.3.2 Base Unit 92

Figure 12:
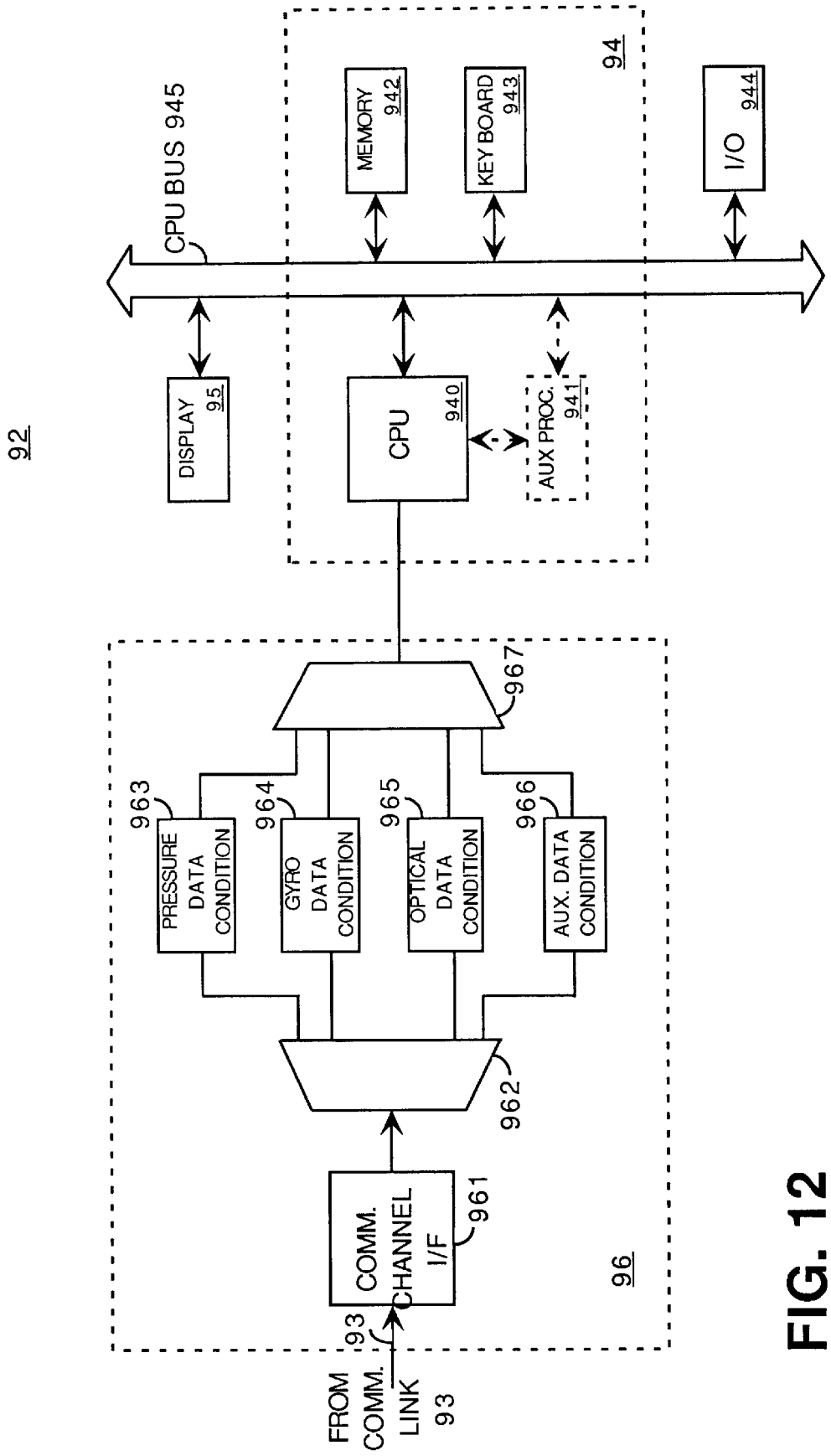
FIG. 12 shows a CB base unit block diagram.

Base unit 92, shown in FIG. 12, communicates with PI 91, receiving sensor signals, processes the sensor signals, and drives any feedback device such as its display unit 95. The base unit is similar to a notebook keyboard computer comprising a CPU 940, keyboard 943, memory 942, and display 95. In addition, the signal conditioning unit 96 includes a transmitter/receiver as part of the communication channel interface 961 with communications link 93, and demux 962, and signal conditioning electronics (963–966) for preconditioning sensor signals from interface 961 and analog-to-digital converters for feeding digitized sensor related signals through mux 967 to the CPU for processing. The base unit can also connect with Wide Area Networks through I/O interface 944 and is able to retrieve and modify electronic versions of the user's documents. An optional auxiliary processor 941 (shown dotted) can be used to augment CPU 940 for executing written message recognition algorithms that require more intensive digital signal processing than that usually done by the CPU.

Advances in micro-electronic techniques can allow most of the functions of the base unit to be incorporated in the PI unit, particularly the sensor signal conditioning, binary coded signal generation, and cache memory for buffering and temporary storage.

C. Other Applications and Variations

The above description of a CB system that uses a pen-instrument and base system was used as a convenient means to describe the operation of a manual entry interactive paper and electronic document handling and processing system.

It should be noted that had any of the other applications listed in section A of the Detailed Description, the basic system configuration would be the same:

(a) a physical document with a writing surface and pre-printed information;

(b) a pen-instrument for reading pre-printed (bar code) information, for sensing writing forces, for sensing pen-instrument motion, for sensing written characters, and for transmitting the information to a base unit; and (c) a base unit for receiving information generated by the pen-instrument, interpreting the information and modifying a stored electronic version of the physical document and displaying the interpreted results to the user for acceptance or correction.

Therefore, the CB system description has served as an adequate vehicle for supporting a general manual entry interactive paper and electronic document handling and processing system. A specialized application program package would customize the system described for each distinct application and document type.

Although the previous description of the PI and its use emphasized optical reading and message writing on a document surface, it should be recognized that the PI may also provide information from its gyroscopes and/or accelerometers for describing non-contact gestures unassociated with physical writing on a document. Two cited examples of this form of input to the system are the "check" signal indicating affirmation (correct) and the "X" signal indicating negation (wrong). Other gestures may be designed for use in a given context to indicate special messages (e.g., in editing, horizontal oscillatory motions may indicate deletion if performed over a previously written message or it may indicate an "underline" if not performed over a written message but under the message).

Selective use of color may also be used to distinguish entries from authorized multiple users by generating an I.D. code for each user's PI at the outset of writing session. A color display could readily identify the source of entries by using a different color coding for each user.

One or more buttons may be provided to initiate certain actions such as indicating that a bar code is to be read.

The PI can be used for other purposes than writing. For example, the PI can function as a pointer or as a "master mouse" that drives a slave mouse cursor on a graphic display or for navigating 3-dimensional virtual reality displays. A button can be used as a mouse button.

Yet another variation of the PI can have a receiver for receiving the output of multiple (infrared) transmitter for position location using triangulation techniques. This variation could be used for blackboard writing or other large surface writing and display boards.

In the foregoing specification, the invention has been described with reference to specific embodiments thereof. It will, however, be evident that various modifications and changes (as described above) may be made thereto without departing from the broader spirit and scope of the invention as set forth in the appended claims. The specification and drawings are, accordingly, to be regarded in an illustrative rather than a restrictive sense.

What is claimed is:

1. A document handling system comprising:

a pen instrument to track writing motions made with the pen instrument so that an electronic document is modified by incorporating reproductions of strokes made with the pen instrument, wherein the pen instrument tracks its own motion and generates signals that represent the writing motions made with the pen instrument; and a processing unit having an interface to receive the signals from the pen instrument, wherein the processing unit stores the electronic document and modifies the electronic document in response to the strokes made with the pen instrument such that representations of the writing motions made with the pen instrument are displayed when the electronic document is displayed.

2. The system of claim 1 wherein the pen instrument comprises at least one transducer to sense self motion in a multi-dimensional space and generate electrical signals representative of the self motion.

3. The system of claim 1 wherein the pen instrument has at least one rate gyroscope to generate at least some of the electrical signals.

4. The system of claim wherein the pen instrument has at least one accelerometer to generate at least some of the electrical signals.

5. The system of claim 1 wherein the pen instrument has at least one accelerometer and at least one gyroscope to generate at least some of the electrical signals.

6. The system of claim 1 further comprising at least two infrared receiving scanning stations located at prescribed positions external to the pen instrument, the scanning stations to scan the area in which the pen instrument is used, wherein the scanning stations receive an infrared signal from the pen instrument.

7. The system of claim 1 further comprising at least two infrared radiating scanning sources located at prescribed positions external to the pen instrument, the scanning sources to illuminate the pen instrument, wherein the pen instrument determines movements based, at least in part, on the scanning sources.

8. A method comprising:

tracking a location of a pen instrument when the pen instrument is used to modify a physical document, wherein sensors within the pen instrument track the location of the pen instrument;

generating signals describing movement of the pen instrument based on the location of the pen instrument;

transmitting the signals to a receiving device, wherein the signals are used to modify an electronic document corresponding to the physical document, and further wherein strokes made with the pen instrument are displayed when the electronic document is displayed.

9. The method of claim 8 wherein generating electrical signals describing the series of strokes comprises generating the electrical signals with at least one transducer to sense self motion in a multi-dimensional space.

10. The method of claim 8 wherein generating electrical signals describing the series of strokes comprises generating the electrical signals with at least one rate gyroscope.

11. The method of claim 8 wherein generating electrical signals describing the series of strokes comprises generating the electrical signals with at least one accelerometer.

12. The method of claim 8 wherein generating electrical signals describing the series of strokes comprises generating the electrical signals with at least one accelerometer and at least one gyroscope.

13. The method of claim 8 wherein tracking a location of a pen instrument comprises generating an infrared signal with the pen instrument that is received by at least two infrared receiving scanning stations located at prescribed positions external to the pen instrument, the scanning stations to scan the area in which the pen instrument is used.

14. The method of claim 8 wherein tracking a location of a pen instrument comprises receiving an infrared signal from at least two infrared radiating scanning sources located at prescribed positions external to the pen instrument, the scanning sources to illuminate the pen instrument, wherein the pen instrument determines movements based, at least in part, on the infrared signals.

15. An apparatus comprising:

means for tracking a location of a pen instrument when the pen instrument is used to modify a physical document, wherein sensors within the pen instrument track the location of the pen instrument;

means for generating signals describing movement of the pen instrument based on the location of the pen instrument;

means for transmitting the signals to a receiving device, wherein the signals are used to modify an electronic document corresponding to the physical document, and further wherein strokes made with the pen instrument are displayed when the electronic document is displayed.

16. The apparatus of claim 15 wherein the means for generating electrical signals describing the series of strokes comprises at least one transducer to sense self motion in a multi-dimensional space.

17. The apparatus of claim wherein the means for generating electrical signals describing the series of strokes comprises at least one rate gyroscope.

18. The apparatus of claim 15 wherein the means for generating electrical signals describing the series of strokes comprises at least one accelerometer.

19. The apparatus of claim wherein the means for generating electrical signals describing the series of strokes comprises at least one accelerometer and at least one gyroscope.

20. The apparatus of claim 15 wherein the means for tracking a location of a pen instrument comprises means for generating an infrared signal with the pen instrument that is received by at least two infrared receiving scanning stations located at prescribed positions external to the pen instrument, the scanning stations to scan the area in which the pen instrument is used.

21. The apparatus of claim 15 wherein the means for tracking a location of a pen instrument comprises means for receiving an infrared signal from at least two infrared radiating scanning sources located at prescribed positions external to the pen instrument, the scanning sources to illuminate the pen instrument, wherein the pen instrument determines movements based, at least in part, on the infrared signals.

* * * * *

UNITED STATES PATENT AND TRADEMARK OFFICE
CERTIFICATE OF CORRECTION

PATENT NO.  : 6,081,261
DATED       : June 27, 2000
INVENTOR(S) : Wolff et al

It is certified that error appears in the above-identified patent and that said Letters Patent is hereby corrected as shown below:

In column 11, at line 15, after "claim" insert --1--
In column 12, at line 34, after "claim" insert --15--.

Signed and Sealed this

First Day of May, 2001

Attest:

NICHOLAS P. GODICI

*Attesting Officer*    *Acting Director of the United States Patent and Trademark Office*